Feb. 4, 1930.  A. I. MARCUM  1,745,432
SPRING SUSPENSION
Filed Nov. 11, 1925   3 Sheets-Sheet 1
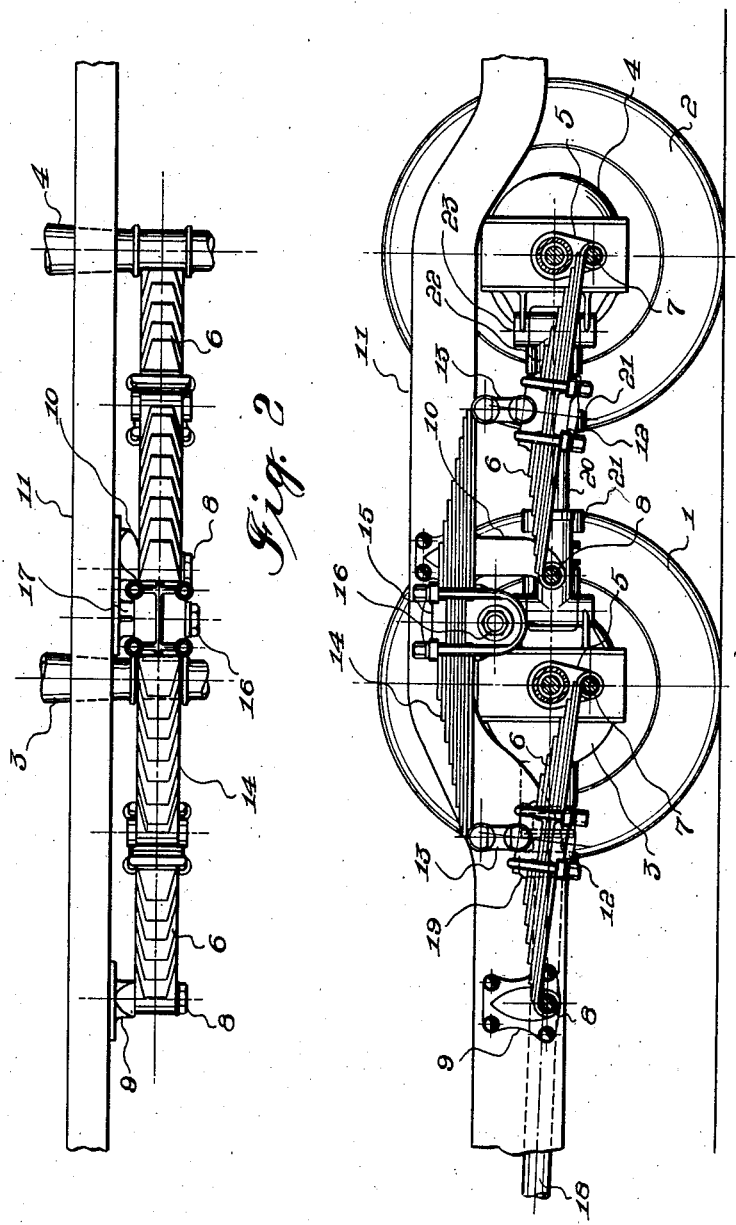
Inventor
Arthur I. Marcum
By William A. Strauch
Attorney

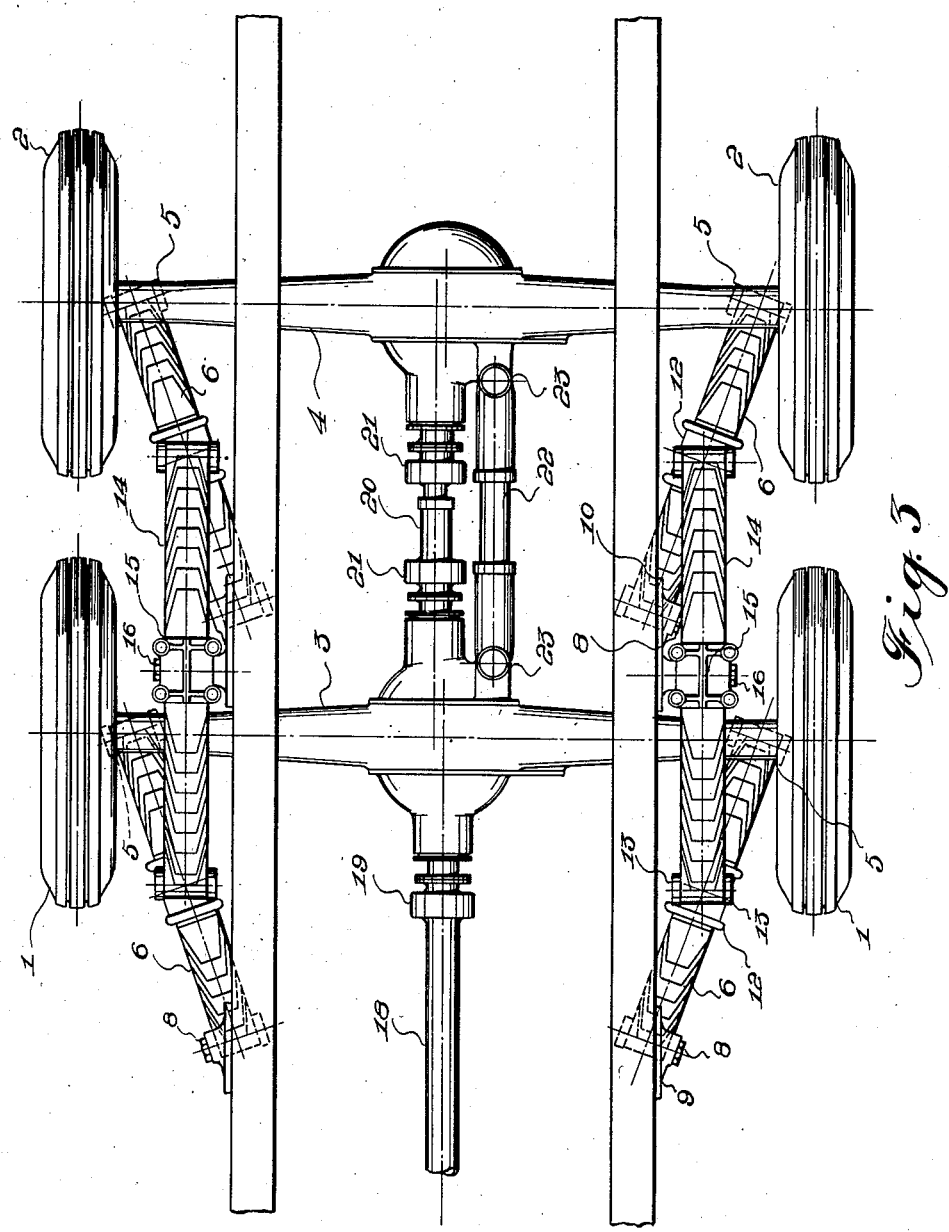

Feb. 4, 1930.  A. I. MARCUM  1,745,432
SPRING SUSPENSION
Filed Nov. 11, 1925   3 Sheets-Sheet 3
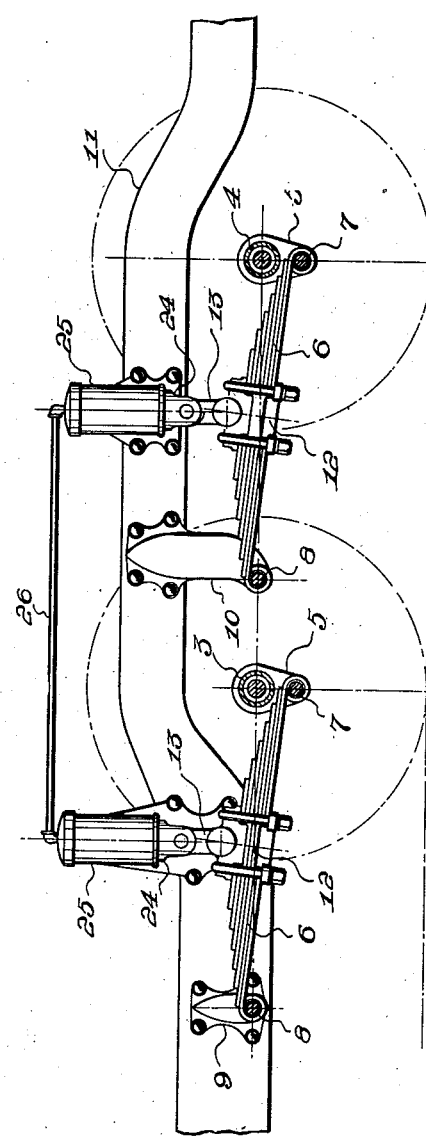
Inventor
Arthur I. Marcum
By William A. Strauch
Attorney Patented Feb. 4, 1930

1,745,432

UNITED STATES PATENT OFFICE

ARTHUR I. MARCUM, OF OAKLAND, CALIFORNIA, ASSIGNOR TO EMORY WINSHIP, OF MACON, GEORGIA

SPRING SUSPENSION

Application filed November 11, 1925. Serial No. 68,298.

The present invention relates to improvements in multiple wheel road vehicles.

More particularly the invention relates to an improved spring suspension for tandem axles in multiple wheel road vehicles. Prior multiple wheel road vehicle constructions have been to a large extent commercially unsatisfactory primarily because of the difficulty in providing suitable spring suspensions which will permit the vehicle to travel over road irregularities without causing undue movements of the frame with relation to the road and because the nature of the prior proposed spring suspensions is such that unsatisfactory steering and driving mechanisms for the tandem wheels must be used. The most satisfactory of prior proposed constructions have used independent truck arrangements interconnecting the tandem axles, and the frames have been supported from the trucks at single trunnion axes. In most prior truck constructions undesirable fore and aft frame movements are introduced as the wheels pass over road irregularities, and torsional strains are introduced in the axles due to the manner of their connection to the springs. In recent developments of this type the trunnion axes have been placed substantially in the plane of the wheel axes in order to eliminate the undesirable fore and aft movements of the frame. The steering and drive arrangements heretofore proposed for the independent truck suspensions are necessarily more or less unsatisfactory because of the inherent limitations of this type of construction. The truck suspensions are particularly unsatisfactory for interconnecting tandem drive axles because of the fact that the propeller shaft or shafts from the front of the vehicle oscillate in arcs which are opposite in curvature to the arc of travel of the forward drive axle under road conditions. The result is that a rapid reversal movement of the spline connections in the propeller shaft occurs. Due to the inertia of parts and the driving stresses, axle bearings and the various joints and connections are rapidly destroyed and the life of the drive arrangement is considerably shortened. A further disadvantage of the prior truck constructions is that the frame load is taken on a single point of suspension at each side of each truck. In copending application S. N. 32,357, filed May 23, 1925, improved successful spring suspensions are shown in which the independent truck constructions together with various disadvantages of independent truck constructions are eliminated. In these improved spring suspensions the linkages are such that the frame movement is equal to one half the axle movement minus the spring deflections. I have, however, found it possible to reduce the frame movement to one half of that obtained by the forms shown in the copending application while retaining all of their advantages by providing the arrangements hereinafter set forth.

Objects of the present invention are to provide an improved spring suspension for multiple wheel road vehicles in which the independent truck arrangement for tandem axles is eliminated and the vehicle construction is correspondingly simplified; to provide a spring suspension for multiple wheel road vehicles in which fore and aft movement of the frame is substantially eliminated and in which the frame is suspended from a plurality of points longitudinally displaced at each side of tandem axles; to provide an improved spring suspension in which road shocks are transmitted through a plurality of springs with different periods of vibration so that the tendency for the springs to vibrate harmoniously is substantially eliminated; to provide an improved spring suspension so that improved steering and drive arrangements for tandem axles may be utilized; and to provide means for connecting the axles to the springs in manner to eliminate torsional strains in the axles as the wheels pass over the road irregularities; and to provide equalizing spring suspensions in which the frame movement is reduced substantially below one half the axle movement minus the spring deflection as the vehicle passes over road irregularities.

Further objects of the invention are such as may be attained by a utilization of the various principles, combinations and sub-combinations hereinafter shown and described and as defined by the terms of the appended claims.

Figure 1 shows, in side elevation, one end of a vehicle frame mounted upon one embodiment of my improved spring suspension, the wheels on one side of the vehicle having been cut away to clarify the disclosure of the suspension.

Figure 2 is a fragmentary plan view of the apparatus of Figure 1, looking down upon the spring suspension appearing in Figure 1.

Figure 3 is a top plan view of a modified form of the apparatus of Figure 1, certain springs of the suspension being inclined with respect to the axis of the vehicle.

Figure 4 discloses another modification of the device of Figure 1, with a pneumatic or hydraulic equalizing device substituted for the equalizing spring of Figure 1.

Figure 5 represents a still further modification, with a rigid equalizing bar employed instead of a resilient or fluid connection.

Referring to Figures 1 and 2, the pairs of ground engaging wheels 1 and 2 support and are driven by the axles 3 and 4. Formed on the axle housings and disposed outside the vehicle frame side members are the depending spring supporting lugs or extensions 5 to which the rear ends of the pairs of leaf springs 6 are secured by means of the pins 7. The forward ends of the springs 6 are pivotally secured at opposite sides of the vehicle frame by means of the pins 8 to the brackets 9 and 10 which in turn are rigidly secured to and support the vehicle frame side members 11. Supported on and secured to the mid portions of the springs 6 are the saddles 12. Saddles 12 are connected by means of the pivotally secured links 13 to the ends of the equalizing springs 14. Secured to and supported on the mid portions of the equalizing springs 14 are the frame supporting saddles 15. Pivotally supported in the saddles 15 are the trunnion pins or members 16 which in turn are rigidly secured to the brackets 17. Brackets 17 are secured to and support frame side members 11.

The axle 3 as shown is preferably of the through drive type disclosed in copending application Serial No. 705,482, filed April 10, 1924, and is driven by means of a propeller shaft 18 through a flexible or universal drive connection 19. The forward end of the shaft 18 is driven from a transmission of any well known type, not shown, through a flexible joint or connection. The rear drive axle 4 may be of any usual differential drive type and is driven by means of a telescoping intermediate shaft 20 provided with the flexible or universal drive connections 21 which in turn are driven from the through drive connection of the axle 3, as disclosed in the copending application. A suitable telescoping torquing connection 22 is provided and is connected to the axles 3 and 4 by means of the vertical pivot pins 23. While axles 3 and 4 have been shown as drive axles, the suspension is obviously applicable to supporting a frame from other tandem axles such for example as a pair of tandem steering axles.

It will be noted that the springs 6 are inclined downward from the front of the vehicle to the rear. While this inclination is not essential it is desirable and improves the operation of the spring suspension due to the fact that shocks from road impacts are transmitted through the axles substantially at a greater angle to the spring leaves than if the springs are not inclined. Due to the connection between the mid portions of the springs 6 through the equalizing spring 14 as shown road shocks are transmitted through the entire spring suspension before being transmitted to the frame, and the deflections of the springs 6 are equalized so that no change in the distance between the axles occurs due to the spring deflections. In this way the stress and shock due to the passage of the vehicle over road irregularities on the intermediate drive and on the torquing, steering or other interconnections between the two axles is minimized. It will also be noted that the spring lengths or arms through which the shocks are transmitted are different due to the difference in length of the springs 14 and 6, and the shocks are accordingly transmitted through spring arms with different periods of vibration, so that a damping effect is attained and the tendency for harmonic vibrations of the frame to be set up is substantially eliminated. It will also be noted that the linkage and arrangement of the suspension is such that the total frame movement due to the passage of the wheels over road irregularities is equal to one quarter of the wheel or axle movement minus the spring deflection. The reduction of the frame movement to one quarter of the wheel movement minus the spring deflection is a substantial advance over the prior equalizing spring constructions for road vehicles which have heretofore reduced the frame movement to only one half of the axle movement minus the spring deflection. It will be seen that by use of my improved spring suspension, movements of the vehicle frame in passing over road irregularities are substantially eliminated with a resulting improvement in riding qualities and durability of the vehicle and considerably lessened road impacts.

In Figure 3 the arrangement shown in Figure 2 is modified by securing the springs 6 at an angle to the longitudinal axis of the chassis as shown in the drawing. This arrangement embodies all of the advantages of the construction shown in Figures 1 and 2 and in addition permits the utilization of increased spring lengths with the same spacing of the axle centers.

In the form shown in Figure 4 the arrangement shown in Figures 1 and 2 is modified by substituting for the equalizing spring 14, a fluid or pneumatic equalizing connection. In this form of the invention the links 13 are pivotally connected to the pistons 25 of the air cylinders 25 which in turn are secured rigidly to and support the frame side members 11. A fluid conduit or connection 26 is provided between the cylinders 25 to permit the passage of fluid and the equalization of pressures between the cylinders 25. The remaining construction of the suspension is the same as set forth in connection with Figures 1 and 2 to the description of which a reference may be had for a full understanding thereof, like parts having been given like reference characters.

In operation of this form of the invention, road shocks are transmitted through the wheels and corresponding springs 6 and piston 24 to the fluid in the corresponding cylinder 25. The shock is partially absorbed in the fluid and partially transmitted through conduit 6 to the other cylinder 25, piston 24 and the other spring 6 before reaching the vehicle. The deflections of the springs 6 and the load on the axles are equalized by the arrangement shown. The fluid utilized is preferably air or gas under suitable pressure, providing a resilient pneumatic equalizing and shock absorbing interconnection between the springs. Due to the equalizing interconnections it will be noted that if the forward end of the frame is unsupported it will tilt downward, in spite of the fact that the frame is connected to the suspension at four points.

In the form of invention shown in Figure 5 a rigid equalizing bar 27 is substituted for the equalizing spring 14 shown in Figure 1. In this arrangement the resilience of the suspension and spring length is reduced due to the rigid beam construction of the member 27, but otherwise the operation is the same as set forth in connection with Figures 1 and 2.

Having described preferred embodiments of the invention, what is desired to be secured by Letters Patent and claimed as new is:

1. The combination with a vehicle frame of a pair of axles arranged adjacent one end of said frame; of a leaf spring secured at one end to each axle, each spring being connected at its other end to said vehicle frame, and relatively short equalizing means interconnecting said springs and said frame.

2. The combination with a vehicle frame and a pair of axles arranged close together and supporting one end of said frame, of a leaf spring secured at one end to each axle and at the other end to said frame, and an equalizing spring interconnecting said leaf springs and said frame.

3. The combination with a vehicle frame and a pair of axles disposed close together and supporting one end of said frame, of a pair of leaf springs with the rear ends thereof connected to said axles and the forward ends thereof pivotally secured to said frame, and an equalizing member connected at its mid portion to said frame and at its ends to points intermediate the ends of said leaf springs.

4. The combination with a vehicle frame and a pair of axles supporting one end of said frame, of a pair of springs secured at one end to each axle, each spring being pivotally connected at its forward end to the vehicle frame, a spring fulcrumed intermediate its ends on the vehicle frame, and shackles connecting the ends of said last mentioned spring intermediate the ends of the first mentioned springs.

5. The combination with a vehicle frame and a pair of axles disposed relatively close together and supporting one end of said frame, of a pair of leaf springs secured at like ends thereof to said axles and at the other ends thereof to said frame, and resilient means pivotally attached to said frame between its ends and connected to said leaf springs at points intermediate their ends.

6. The combination with a vehicle frame and a pair of axles supporting one end of said frame, of a pair of leaf springs secured intermediate its ends to the vehicle frame, a pair of leaf springs pivotally connected at like ends thereof to said frame and at the opposite ends thereof to said axles; and a connection between the mid portions of said first mentioned springs and the ends of said last mentioned spring.

7. A spring suspension for one side of a vehicle including a pair of axles disposed relatively close together and supporting one end of said frame, comprising a spring pivoted at one end to said frame and connected at its other end to one of said axles, a second spring pivoted at one end to said frame and connected at its other end to the other of said axles and equalizing means secured to both of said springs between the ends thereof, said equalizing means being arranged to distribute the load on that end of said frame between said springs, and to transmit road shocks from one of said springs to its companion spring at that side of the vehicle.

8. A spring suspension for one side of a road vehicle embodying a frame supported at one end by a pair of axles arranged relatively close together comprising a spring pivoted to the frame at one end and connected to one of said axles at its other end, a second spring pivoted to said frame at a point spaced from the pivotal connection of said first spring to the frame and connected to the other axle adjacent its other end and a relative short load equalizing and shock transmitting lever connected between its ends to said frame and at one end to an intermediate portion of one of said springs and at its other end to an intermediate portion of the other of said springs.

9. The combination defined in claim 8 in which the springs that are connected at one end to the frame and at another end to an axle diverge substantially outwardly with respect to a line normal to the axles extending longitudinally of the frame.

10. A spring suspension for one side of a road vehicle embodying a pair of axles disposed relatively close together and supporting one end of a frame, comprising three springs, one of said springs being connected at one end of said frame and adjacent its other end to one of said axles, the second of said springs being connected at one end to said frame and adjacent its other end to the other of said axles, the third spring being pivoted between its ends to said frame and connected at its ends to intermediate portions of each of said first named springs respectively, said third spring being short compared to the length of the vehicle frame.

11. The combination defined in claim 10 in which the points of connection of said first and second named springs to said frame are so disposed that the axles swing in substantially parallel arcs as the vehicle moves over road irregularities.

12. A spring suspension for one side of a vehicle of the type having a main frame and tandem axles disposed beneath one end of such frame; said spring suspension comprising a pair of springs, each having one of its ends supported on one of the axles; a pair of transverse pivotal members carried by the main frame, said members being fixed against translatory movement with respect to the frame; said pair of springs being directly pivoted up said pair of pivotal members at a pair of points spaced from the axle supported ends of said springs; an equalizing member pivoted intermediate its ends upon the frame and a pair of links pivotally interconnecting the ends of said equalizing member with another pair of points on the said springs.

In testimony whereof I affix my signature.

ARTHUR I. MARCUM.